Jan. 2, 1962     E. F. DOE     3,015,136
RESILIENT MAT STRUCTURE
Filed Oct. 17, 1957

*INVENTOR.*
ELMER F. DOE
BY
*Pennie, Edmonds, Morton, Barrows & Taylor*
ATTORNEYS United States Patent Office 3,015,136
Patented Jan. 2, 1962

3,015,136
RESILIENT MAT STRUCTURE
Elmer F. Doe, Pawling, N.Y., assignor to Pawling Rubber Corporation, Pawling, N.Y., a corporation of Delaware
Filed Oct. 17, 1957, Ser. No. 690,778
1 Claim. (Cl. 20—78.6)

This invention relates to mat structures, such as commonly utilized in door mats and the like, and particularly to a mat structures incorporating a plurality of resilient links of novel and improved design.

One of the features of the invention resides in the provision of a mat structure comprising a plurality of links or elements joined together, as by means of a plurality of connecting wires, wherein the structure generally, and in particular the form of the links incorporated therein, is novel and improved, to the end that improved continuity of mat surface is provided. More specifically, the invention relates to a mat formed of a plurality of separate links arranged in longitudinal rows and joined together by connecting wires disposed transversely of the rows, wherein the design of the links is such as to provide a relative minimum of spacing between the links of each longitudinal row.

Another specific feature of the invention resides in the provision of a mat structure comprising a plurality of links joining together in an articulated manner, wherein the links are so designed as to provide a lightweight overall mat structure having substantial resilience and yet providing adequate support when in use. In this respect, the links of the new mat structure are so designed as to require a relative minimum amount of material and to be individually flexible and resilient to supported loads. At the same time, the structural features of the links are such that substantial weight may be supported thereon without producing undesirable stresses or distortions.

For a better understanding of the invention reference should be made to the following description and to the accompanying drawing in which.

Figure 1:
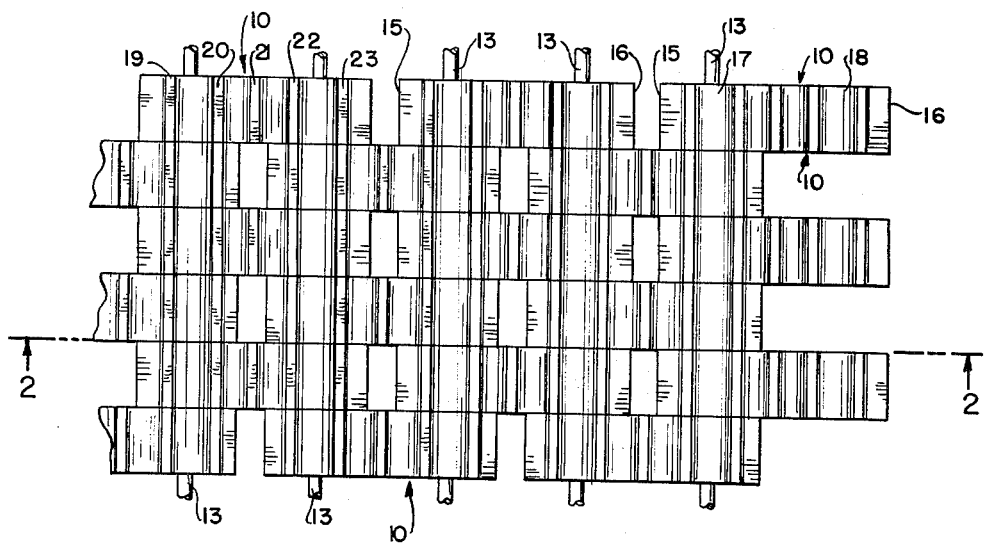
FIG. 1 is a fragmentary top plan view of a mat structure incorporating the features of the invention.

Referring now to the drawing, the reference numerals 10 designate, generally, individual links of a mat structure, each link being of elongate form and having spaced transverse openings 11, 12 therein intermediate its ends. In an otherwise conventional mat assembly, suitable side pieces (not shown) are provided for anchoring a plurality of connecting wires 13. The wires 13 are arranged in parallel relation and are spaced a predetermined distance apart. Generally, although not necessarily, the links 10 are arranged in longitudinal rows, with the links of adjacent rows being offset, substantially as shown in FIG. 1.

In accordance with the present invention, each link 10 is formed of resilient material, such as rubber or suitable plastic, and is provided with a body portion comprising a relatively thin web 14 extending between the openings 11, 12. Generally cylindrical portions 17, 18 surround the openings 11, 12, and end portions 15, 16 project longitudinally beyond the cylindrical portions. Extending vertically upward and downward from the body portion of the link are integral bosses 19—23, 19a—23a. Advantageously the bosses are arranged in vertically aligned pairs, such as 19—19a, etc., and the outer ends of the bosses define spaced, parallel planes.

Figure 2:
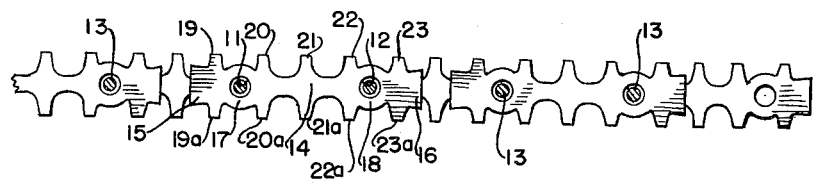
FIG. 2 is a cross-sectional view taken along line 2—2 of FIG. 1.

As shown best in FIG. 2, a pair of bosses is provided adjacent each side of each of the openings 11, 12, advantageously in such proximity thereto that the bosses partly merge into the generally cylindrical portions 17, 18. In the illustrated mat structure, a single pair of bosses 21, 21a is provided centrally between the openings 11, 12, in the center portion of the relatively flexible web 14.

Figure 3:
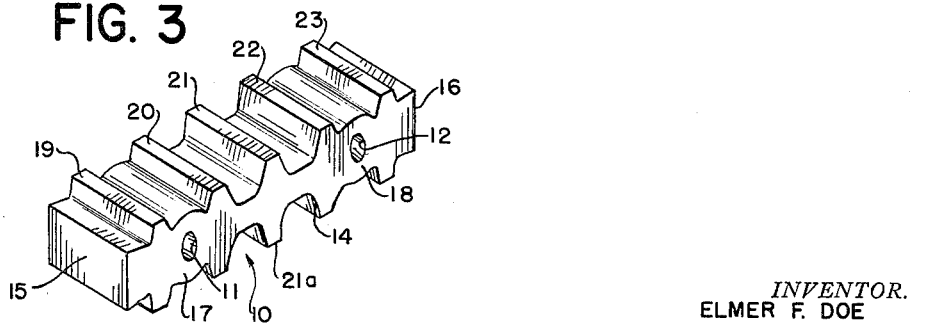
FIG. 3 is an enlarged perspective view of an improved link incorporating features of the invention and embodied in the mat structure of FIGS. 1 and 2.

Advantageously, the end portions 15, 16 of the links project longitudinally of the link and beyond the openings 11, 12, for a relatively substantial distance, the end portions being of relatively thick cross sections, as shown in FIGS. 2 and 3. In accordance with one specific aspect of the invention, the end portions 15, 16 extend beyond the openings 11, 12, a distance not substantially less than one-third the distance between the openings. Thus, by way of example, in a link having width and height of approximately one-half inch, and a length of approximately one and three-quarters inches, the distance between the openings 11, 12 may be approximately one inch, with the end portions 15, 16 extending approximately three-eighths of an inch beyond the openings. The arrangement is such, as shown in FIGS. 1 and 2, that in a mat structure having connecting wires 13 spaced uniformly approximately one inch apart, the openings between adjacent links in each longitudinal row thereof will be approximately one-quarter inch.

When the improved mat structure is in use, substantial weight may be supported by the links 10, even though the links are of relatively lightweight construction, since applied loads are transmitted directly through the vertical pairs of bosses to the base surface upon which the mat structure is supported. In conjunction with the foregoing, vertical pairs of bosses are positioned on opposite sides of the connecting wires, so that heavy loads applied to the mat structure are carried on both sides of the wires and do not tend to twist or otherwise undesirably distort the individual links.

One of the substantial advantages of the new mat structure resides in the fact that the links 10 may be of lightweight construction, in relation to weight supporting ability and to durability in use. Moreover, the bosses 19—23a have substantial resilience and flexibility, providing improved resilience in the overall mat structure.

Another advantageous feature of the invention resides in the fact that the links may be provided with longitudinally projecting end portions of substantial length, in relation to the spacing between connecting wires, so that the openings between individual links are of reduced size. This is rendered practical by the provision of pairs of bosses 19, 19a and 23, 23a projecting from end portions, adjacent and on opposite sides of the connecting wires, which provide proper support for the end portions of the links.

In addition to the foregoing, the improved link of the invention is adapted for economical manufacture, since the shape thereof is such as to enable the links to be extruded.

It should be understood that the specific form of the invention herein illustrated and described is intended to be representative only, as certain changes may be made therein without departing from the clear teachings of the disclosure. Accordingly reference should be made to the following appended claim in determining the full scope of the invention.

I claim:

In a mat structure of the type comprising a plurality of links formed of resilient material joined by connecting wires and arranged in staggered relation with links of one longitudinal row partly overlapping links of adjacent longitudinal rows, an improved link of elongate form having a generally horizontal body portion, said body portion having spaced transverse openings therethrough spaced a substantial distance inward, relative to the total length of the body, from its ends, connecting wires extending transversely through said openings to connect links of adjacent rows, the location of said openings in relation to the length of said body being such that the space between links of a longitudinal row is a small fraction of the length of said body, said wires being retained within said link solely by said body portion, a plurality of integral bosses projecting vertically upward and downward from said body portion in areas thereof other than those in substantial vertical alignment with said transverse openings, the upwardly projecting bosses forming supporting surfaces and the downwardly projecting bosses forming base surfaces, at least one of said upwardly projecting bosses and one of said downwardly projecting bosses being positioned in vertical alignment adjacent each side of each of said openings, said last mentioned upwardly and downwardly projecting bosses being spaced apart a distance wider than the diameter of said openings, whereby vertical loads are supported by said bosses along principal axes bypassing said openings.

References Cited in the file of this patent

UNITED STATES PATENTS

| | | |
|---|---|---|
| 1,465,784 | Richardson et al. | Aug. 21, 1923 |
| 1,908,585 | Williams | May 9, 1933 |
| 1,914,680 | Williams | June 20, 1933 |
| 2,126,307 | Boedeker | Aug. 9, 1938 |
| 2,795,001 | Wood | June 11, 1957 |
| 2,807,842 | Galkin | Oct. 1, 1957 |

FOREIGN PATENTS

| | | |
|---|---|---|
| 767,499 | France | May 1, 1934 |
| 820,202 | Germany | Nov. 8, 1951 |